United States Patent
Dong et al.

(10) Patent No.: US 10,396,561 B2
(45) Date of Patent: Aug. 27, 2019

(54) COORDINATION CONTROL METHOD OF MULTI-TERMINAL VSC-HVDC TRANSMISSION SYSTEM

(71) Applicants: NR ELECTRIC CO., LTD, Nanjing (CN); NR ENGINEERING CO., LTD, Nanjing (CN)

(72) Inventors: Yunlong Dong, Nanjing (CN); Jie Tian, Nanjing (CN); Gang Li, Nanjing (CN); Dongming Cao, Nanjing (CN); Haiying Li, Nanjing (CN); Haibin Liu, Nanjing (CN)

(73) Assignees: NR ELECTRIC CO., LTD, Nanjing (CN); NR ENGINEERING CO., LTD, Nanjing (CN)

( * ) Notice: Subject to any disclaimer, the term of this patent is extended or adjusted under 35 U.S.C. 154(b) by 184 days.

(21) Appl. No.: 15/027,434

(22) PCT Filed: Jul. 1, 2013

(86) PCT No.: PCT/CN2013/078558
§ 371 (c)(1),
(2) Date: Apr. 6, 2016

(87) PCT Pub. No.: WO2014/071742
PCT Pub. Date: May 15, 2014

(65) Prior Publication Data
US 2016/0308359 A1  Oct. 20, 2016

(30) Foreign Application Priority Data

Nov. 8, 2012 (CN) .......................... 2012 1 0442336

(51) Int. Cl.
*H02J 3/36* (2006.01)
*H02J 1/10* (2006.01)
(Continued)

(52) U.S. Cl.
CPC ................ *H02J 3/36* (2013.01); *H02J 1/102* (2013.01); *H02J 1/14* (2013.01); *H02J 13/0003* (2013.01); *H02J 13/0096* (2013.01)

(58) Field of Classification Search
CPC .. H02J 1/02; H02J 1/14; H02J 13/0003; H02J 13/0096; H02J 3/36; H02J 3/00; H02J 1/102; H02J 1/04–1/08; H02M 3/00
(Continued)

(56) References Cited

U.S. PATENT DOCUMENTS 5,130,561 A * 7/1992 Elliott .................... H02M 1/14
307/31
6,175,747 B1 * 1/2001 Tanishima ............... H04B 1/54
455/403

(Continued)

FOREIGN PATENT DOCUMENTS

| CN | 102082432 A | 6/2011 |
| CN | 102969733 A | 3/2013 |
| WO | WO2012000548 A | 1/2012 |

OTHER PUBLICATIONS

Xiao Lei et al "Control and protection strategies for parallel multi=terminal HVDC power transmission system and their simulation." Power system technology,Feb. 2012, vol. 36, No. 2, pp. 244-249.

(Continued)

*Primary Examiner* — Harry R Behm
*Assistant Examiner* — Lorena D Bruner
(74) *Attorney, Agent, or Firm* — Masuvalley & Partners

(57) ABSTRACT

The present invention discloses a coordination control method of a multi-terminal VSC-HVDC transmission system. If a direct current voltage master control station shuts down, a direct current voltage control slave station takes over direct current voltage control, and remaining convertor stations keep original control modes. The takeover steps (Continued)

comprise that under the condition that inter-station communications are effective, the master control station sends a shutdown message to the slave station through the inter-station communications, and when the slave station monitors that the direct current voltage master control station shuts down, the slave station switches a current control mode into a direct current voltage control mode; and under the condition that inter-station communications fail or inter-station communications are absent, the slave station monitors changes of the direct current voltage of a system.

11 Claims, 2 Drawing Sheets

(51) Int. Cl.
 *H02J 1/14* (2006.01)
 *H02J 13/00* (2006.01)
(58) Field of Classification Search
 USPC .......................................................... 363/35
 See application file for complete search history.

(56) References Cited

U.S. PATENT DOCUMENTS

| | | | |
|---|---|---|---|
| 2004/0075600 A1* | 4/2004 | Vera | H02J 1/102 341/166 |
| 2010/0052425 A1* | 3/2010 | Moore | H01L 31/02021 307/52 |
| 2010/0201405 A1* | 8/2010 | Ahmad | H02M 3/1584 327/108 |
| 2014/0285010 A1* | 9/2014 | Cameron | H02J 1/14 307/29 |

OTHER PUBLICATIONS

Meng Liang "Research on the control of VSC-Multiterminal HVDC system",China master dissertations full-text database, Jan. 27, 2012, pp. 71-73.

* cited by examiner

COORDINATION CONTROL METHOD OF MULTI-TERMINAL VSC-HVDC TRANSMISSION SYSTEM

FIELD OF THE INVENTION

The present invention relates to a control technology in the field of VSC-HVDC transmission system, in particular to a coordination control method of a multi-terminal VSC-HVDC transmission system.

DESCRIPTION OF RELATED ART

Along with the development of power electronic devices and control technology, the capacity and voltage levels are higher and higher. Multi-terminal VSC-HVDC power transmission is more advantageous than two-terminal VSC-HVDC power transmission in operation flexibility and reliability. Meanwhile, establishment of the multi-terminal VSC-HVDC power transmission can meet the demands of interconnection of power grids, power supply of urban power grids, interconnection of multiple wind power plants (new resources) and the like and have important significance. But the multi-terminal VSC-HVDC power transmission is more complex than the two-terminal VSC-HVDC power transmission. How to realize the coordination control of each station of the multi-terminal VSC-HVDC power transmission is a difficult point of the multi-terminal VSC-HVDC power transmission.

At present, in the industry, regarding the multi-terminal VSC-HVDC power transmission, there are plural coordination control modes of as follows:

A single point direct current voltage coordination control mode:
only one convertor station controls direct current voltage, and remaining convertor stations select active power control or frequency control. By taking tri-terminal VSC-HVDC power transmission as an example, a schematic diagram of the single point direct current voltage coordination control is as shown in FIG. 1, the same principle also applies to other multi-terminal VSC-HVDC power transmission systems, wherein a station 1 controls direct current voltage and achieves effects of direct current voltage stabilizing and power balancing nodes. Remaining convertor stations are in active power or frequency control.

The defect of the single point direct current voltage coordination control is that when the station controlling the direct current voltage shuts down, the whole multi-terminal VSC-HVDC power transmission systems exits operation due to voltage instability.

A direct current voltage slope-based multi-point direct current voltage coordination control mode:
multiple converters connected with an alternative current power and having a power adjusting capacity operate at direct current voltage in a slope control mode. By taking tri-terminal VSC-HVDC power transmission as an example, the station 1 and a station 2 in the three convertor stations are selected to adopt a slope-based direct current voltage control mode, and a station 3 selects an active power control or frequency control mode, as shown in FIG. 2. Direct voltage reference voltages of the station 1 and station 2 are as shown in formula (1):

$$U_{dc1\_ref} = U_{int} - k_1 I_{dc1}$$

$$U_{dc2\_ref} = U_{int} - k_2 I_{dc2} \quad (1)$$

wherein, $U_{int}$ is a direct current voltage rated value of the station 1 and station 2, $k_1$ is a voltage-current slope of the station 1, $k_2$ is a voltage-current slope of the station 2, $I_{dc1}$ is a current reference value of the station 1, and $I_{dc2}$ is a current reference value of the station 2. By controlling a proportional relation between the slopes $k_1$ and $k_2$, a ratio of receiving or sensing active power of the two rated direct current voltage convertor stations is controlled.

By adopting the direct current voltage slope-based multi-point direct current voltage coordination control mode, the power adjusting capacity and stability of the whole multi-terminal system are improved, but its direct current voltage is poor in quality and is nonconstant, and single converters participating in direct current voltage control cannot realize active power control.

(3) A direct current voltage deviation-based multi-point direct current voltage coordination control mode:
By taking tri-terminal VSC-HVDC as an example, a principle of the direct current voltage deviation-based multi-point direct current voltage coordination control mode is as shown in FIG. 3. The station 1 adopts rated direct current control, the station 2 adopts a power controller with a direct current voltage deviation, and the station 3 adopts a rated active power control or rated frequency control. In normal operation, the station 1 is designated as a direct current master control station. When the station 1 shuts down, power of a direct current network loses balance, if the power injected to the direct current network is smaller than a sending power of the direct current network, the direct current voltage drops. When the direct current voltage detected by the station 2 is lower than a direct current voltage threshold value $U_{ref}$, the station 2 switches a current control mode into a rated direct current voltage control mode within a capacity allowable range, and stabilizes the direct current voltage of a VSC-HVDC system. The direct current voltage deviation-based multi-point direct current voltage coordination control mode improves the stability of a multi-terminal VSC-HVDC system compared with the single point direct current voltage coordination control mode. However, the detection of the direct current voltage rising or dropping to a rated value is slower, and the direct current voltage of the system has larger oscillation in takeover, and an overvoltage or undervoltage fault easily occurs.

In order to solve the defects of above coordination control strategies, improve the stability and reliability of the multi-terminal VSC-HVDC power transmission and fully play advantages of the multi-terminal VSC-HVDC power transmission, it requires a coordination control strategy with higher robustness and greater flexibility.

SUMMARY OF THE INVENTION

The present invention aims to provide a coordination control method of a multi-terminal VSC-HVDC power transmission system, which can effectively control direct current voltage, and when the direct current voltage master control station shuts down due to a fault, the direct current voltage control slave station can take over the control, so that oscillation of the system direct current voltage is reduced.

In order to achieve above aims, a solution of the present invention is:

According to a coordination control method of a multi-terminal VSC-HVDC power transmission system, the direct current power transmission system comprises a direct current voltage master control station, at least one direct current control slave station and at least one common converter station, wherein the direct current voltage master control station controls the direct current voltage of the whole system, and all remaining converter stations select the active power control or the frequency control modes; if the direct current voltage master control station shuts down, one direct current voltage control slave station takes over the direct current voltage control, and the remaining converter stations keep their original control modes. The takeover steps are as follows:

(1) under the condition that inter-station communications are effective, the master control station sends a shutdown message to the slave station through the inter-station communications, and when the slave station monitors that the direct current voltage master control station shuts down, the slave station switches from its current control mode into the direct current voltage control mode; and (2) under the condition that inter-station communications fail or inter-station communications are absent, the slave station monitors variation of the direct current voltage of the system, and when the difference value of a direct current voltage value falls outside of a definite threshold range, the slave station switches from its current control mode into the direct current voltage control mode.

The direct current voltage master control station and the direct current voltage control slave station are connected by the inter-station communications.

In the step (1), after the direct current voltage control slave station monitors that the direct current voltage master control station shuts down by the inter-station communications, the slave station quickly takes over the direct current voltage control without deviation, and a direct current voltage command value is a rated value or a current operation value.

In the step (1), shutdown information is shutdown state, shutting state, alternative current switch separation or electrode isolation information.

In the step (2), the direct current voltage control slave station takes over direct current voltage control with deviation, controls the direct current voltage to be a reference value set in takeover, or recovers to a rated value by slope.

In the step (2), a threshold value is 0.1-0.3 times of the rated value the system direct current voltage.

At least two direct current voltage control slave stations are arranged, and these direct current voltage control slave stations take over direct current voltage control according to priority.

After the direct current voltage control slave station takes over the direct current voltage control, under the condition of operating for a certain period and then recovering normal operation, the direct current voltage master control station selects active power control or frequency control.

After the direct current voltage control slave station takes over the direct current voltage control, under the condition of operating for a certain period and then recovering normal operation, the direct current voltage master control station serves as a new direct current voltage control slave station.

After the solution is adopted, the present invention can realize effective system direct current voltage control, under the condition that inter-station communications fail, when the direct current voltage master control station exits operation, the direct current voltage control slave station can quickly take over without deviation, and oscillation of the system direct current voltage is very small. When the inter-station communications fail, takeover can be realized by a deviation method. Normal work can be realized under the conditions of with or without deviations, takeover without deviation is a master method, and the takeover with deviation is a spare method, so it is ensured that after the direct current voltage master control station has a fault, remaining convertor stations can continues to stably operate, and system reliability is improved.

DETAILED DESCRIPTION OF THE INTENTION

Figure 1:
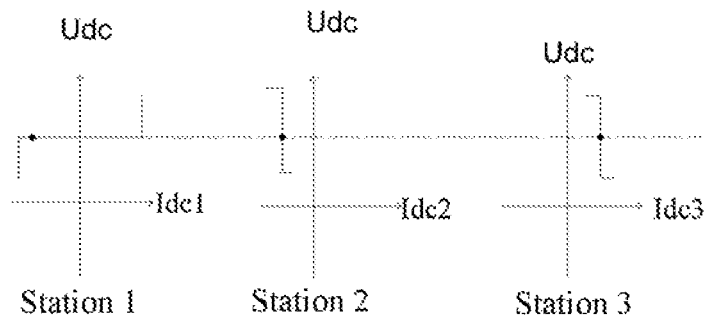
FIG. 1 is a schematic diagram of an existing single point direct current voltage coordination control mode of the present invention, wherein, all subgraph x coordinates are direct current, and y coordinates are direct current voltage; a station 1 controls the direct current voltage, and a station 2 and a station 3 are in active power control or frequency control.
Figure 2:
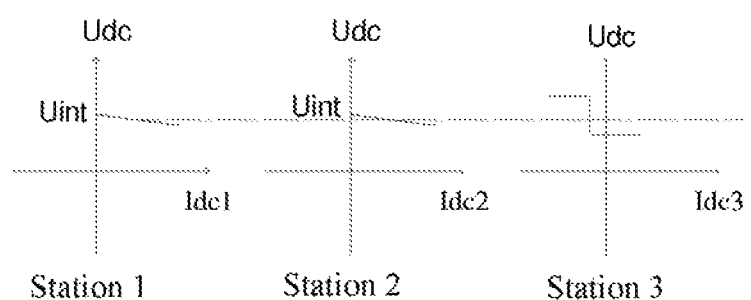
FIG. 2 is a schematic diagram of a direct current voltage slope-based multi-point direct current voltage coordination control mode of the present invention (by taking tri-terminal VSC-HVDC as an example), wherein, all subgraph x coordinates are direct current, and y coordinates are direct current voltage; the station 1 and the station 2 adopt a slope-based direct current voltage control mode and the station 3 selects an active power control or frequency control mode.
Figure 3:
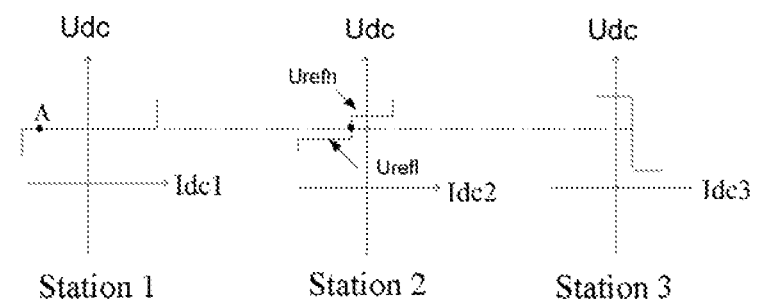
FIG. 3 is a schematic diagram of a direct current voltage deviation-based multi-point direct current voltage coordination control mode of the present invention (by taking tri-terminal VSC-HVDC as an example), wherein, all sub graph x coordinates are direct current, and y coordinates are direct current voltage; the station 1 is a direct current voltage master control station and adopts a direct current voltage control mode; the station 2 is a direct current voltage control slave station, adopts a rated active power or rated frequency control mode when a system direct current voltage is larger than a low limited value Urefl and is smaller than a high limited value Urefh, operating within the reference voltage range, and switches to a direct current voltage mode when the system direct current voltage is smaller than the low limited value Urefl or is larger than the high limited value Urefh, falling outside the reference voltage range; and the station 3 is a common station and adopts an active power or frequency control mode.

The technical solution of the present invention is described in detail in combination with drawings and specific embodiments.

A coordination control method of a multi-terminal VSC-HVDC power transmission system provided in the present invention combines an inter-station communication function and a direct current voltage deviation-based coordination control method, in a direct current power transmission system, usually one direct current voltage master control station and at least one direct current voltage control slave station are arranged, others serve as common converter stations, the direct current voltage master control station and the direct current voltage control slave stations are connected by inter-station communications, but the common converter stations are connected with the direct current voltage master control station or the direct current voltage control slave station by the inter-stations communications or not; when control is realized, the direct current voltage master control station controls the direct current voltage of the whole system, that is, performs direct current voltage control, and the direct current voltage control slave station and all the common converter stations select the active power control or frequency control modes; if the direct current voltage master control station shuts down, the direct current voltage control slave station takes over direct current voltage control, and the remaining common converter stations keep original control modes. When two or more direct current voltage control slave stations are arranged, the direct current voltage control slave stations take over the direct current voltage control according to a predetermined priority. The takeover steps are as follows:

(1) under the condition that inter-station communications are effective, the master control station sends a shutdown message to the slave station through the inter-station communications, when the slave station monitors that the direct current voltage master control station shuts down, the slave station switches from its current control mode the into the direct current voltage control mode, a direct current voltage command value is a rated value or a current operation value; and shutdown information is shutdown state, shutting state, alternative current switch separation or electrode isolation or all information indicating that the converter station is not able to operate normally; and (2) under the condition that inter-station communications fail or inter-station communications are absent, the slave station monitors variation of the direct current voltage of the system. When the difference value of a direct current voltage value and a rated value falls outside of a definite threshold range (the threshold range being 0.1-0.3 times of the rated value of the system direct current voltage), the slave station switches from its current control mode into the direct current voltage control mode, and the direct current voltage control slave station controls the direct current voltage to be a reference value set in the takeover, step, or recovers to a rated value by slope.

In addition, after the coordination control method provided in the present invention is adopted, under the condition of operating for a certain period and then recovering normal operation, the direct current voltage master control station selects active power control or frequency control and serves as a new direct current voltage control slave station.

Figure 4:
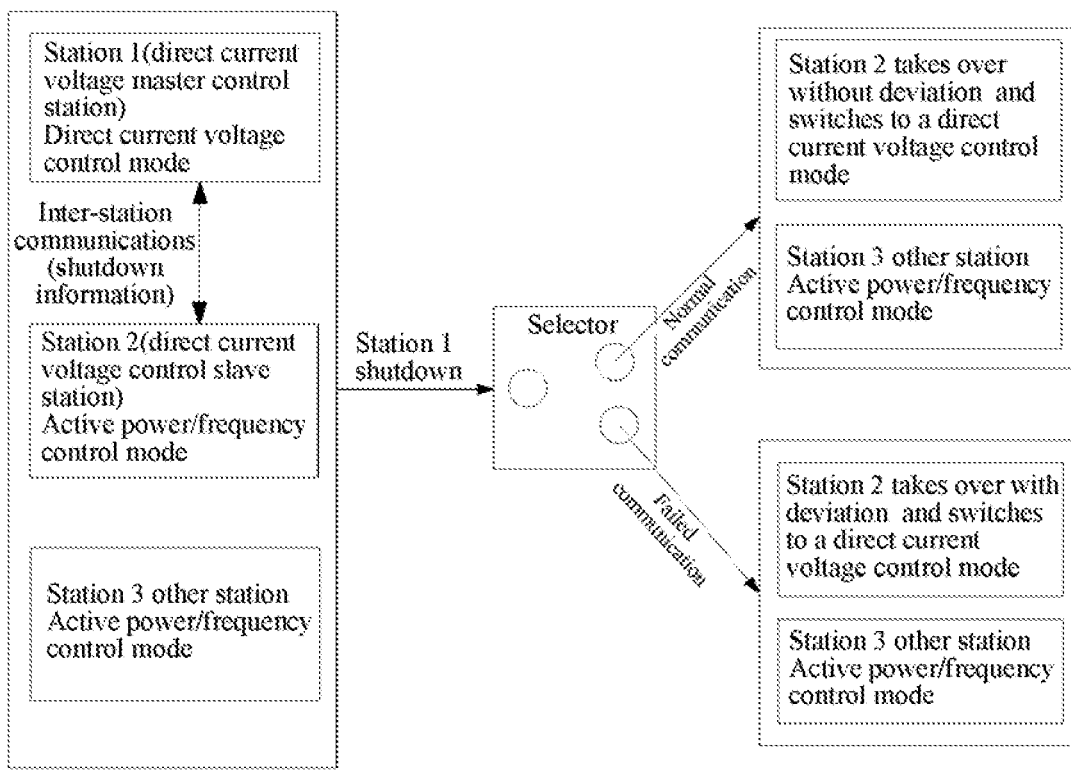
FIG. 4 is control schematic diagram of a coordination control method of the present invention (by taking tri-terminal VSC-HVDC as an example).

By taking a tri-terminal VSC-HVDC power transmission system as a specific embodiments in combination with drawings, a specific coordination control mode is further described in detail. With reference to FIG. 4, in the tri-terminal VSC-HVDC power transmission system, in normal operation, the station 1 is a direct current voltage master control station and selects a rated direct current voltage control mode; the station 2 is a direct current voltage control slave station and selects a rated active power or rated frequency control mode; and the station 3 is a common convertor station, and selected a rated active power or rated frequency control mode. The station 1 and the station 2 are communicated by inter-station communications, and the station 1 sends a system shutdown message to the station 2 by the inter-station communications.

When the station 1 exits operation, if the inter-station communications are normal, the station 2 determines a direct current voltage takeover mode to be a takeover mode without deviation by a selector, after monitoring shutdown information of the station 1 by the inter-station communications, the station 2 switches a control mode per se to a rated direct current voltage control mode from a rated active power or rated frequency control mode, a direct current voltage reference value selects a preset rated value, thus realizing the direct current voltage takeover control without deviation, and keeping the direct current voltage of the VSC-HVDC power transmission system constant; and the station 3 still keeps the original control mode unchanged.

When the station 1 exits operation, if the inter-station communications fail, the station 2 determines a direct current voltage takeover mode to be a takeover mode with deviation by a selector, after the station 1 shuts down, fluctuation of direct current voltage is caused, after monitoring that a fluctuation range of the direct current voltage exceeds a threshold value, the station 2 judges that the station 1 stops operation, and switches a control mode to a rated direct current voltage control mode from a rated active power or rated frequency control mode, a direct current voltage reference value selects a preset rated value, thus realizing the direct current voltage takeover control with deviation, and keeping the direct current voltage of the VSC-HVDC power transmission system constant.

The present invention takes the tri-terminal VSC-HVDC power transmission system to introduce the embodiments, but is not limited to the tri-terminal system, and is suitable for multi-terminal VSC-HVDC power transmission systems with more than three terminals. Any coordination control method involving the combination of an inter-station communication coordination control method and a direct current deviation-based control method fall within the scope of the present invention.

Finally, if should be noted that the technical solution of the present invention is described in combination with the embodiments and is not limited thereto. Common skilled in the art should understand that those skilled in the art can perform modifications or equivalent substitutions on the on the specific embodiments of the present invention, but these modifications or equivalent substitutions all fall within the protective scope of pended claims.

What is claimed is:

1. A coordination control method of a multi-station VSC-HVDC power transmission system, the method comprising:
    assigning a direct current voltage master control station to work in a direct current voltage control mode, wherein the direct current voltage master control station working in the direct current voltage control mode controls a direct current voltage of the multi-station VSC-HVDC power transmission system;
    assigning at least one direct current voltage control slave station to work in a slave mode and selects active power control or frequency control;
    providing at least one common converter station working in active power control or frequency control, said at least one common converter station not being assigned as a master station or a slave station and remains in its initial active power control or frequency control throughout system operation;
    monitoring the direct current voltage master control station and the direct current voltage of the multi-station VSC-HVDC power transmission system through said at least one direct current voltage control slave station; and
    switching one of the at least one direct current voltage control slave station from the slave mode to work in the direct current voltage control mode when the direct current voltage control slave station monitors that the direct current voltage master control station sent a shutdown information or a difference value of the direct current voltage value and a rated value falls outside a definite threshold range.

2. The coordination control method of the multi-station VSC-HVDC power transmission system according to claim 1, wherein the direct current voltage master control station and the direct current voltage control slave station are connected by inter-station communications.

3. The coordination control method of the multi-station VSC-HVDC power transmission system according to claim 1, wherein the switching of the one of the at least one direct current voltage control slave station from the slave mode to work in the direct current voltage control mode is done when the direct current voltage control slave station monitors that the direct current voltage master control station sent the shutdown information, and takes over the direct current voltage control without deviation, and a direct current voltage command value is a rated value or a current operation value.

4. The coordination control method of the multi-station-VSC-HVDC power transmission system according to claim 1, wherein the shutdown information is shutdown state, shutting state, alternative current switch separation or electrode isolation information.

5. The coordination control method of the multi-station VSC-HVDC power transmission system according to claim 1, wherein the switching of the one of the at least one direct current voltage control slave station from the slave mode to work in the direct current voltage control mode is done when the difference value of the direct current voltage value and the rated value falls outside the definite threshold range and the direct current voltage control slave station takes over direct current voltage control with deviation, controls the direct current voltage to be a reference value set in takeover, or recovers to a rated value by slope.

6. The coordination control method of the multi-station VSC-HVDC power transmission system according to claim 5, wherein the definite threshold range is 0.1-0.3 times of the rated value.

7. The coordination control method of the multi-station VSC-HVDC power transmission system according to claim 1, wherein at least two direct current voltage control slave stations are arranged, and the two direct current voltage control slave stations take over direct current voltage control according to a predefined priority.

8. The coordination control method of the multi- station VSC-HVDC power transmission system according to claim 1, further comprising assigning the direct current voltage master control station to work in the slave mode when the direct current voltage master control station returns back to a normal operating mode and selecting the direct current voltage master control station to work as active power control or frequency control.

9. A multi-station VSC-HVDC power transmission system, comprising:
one direct current voltage master control station working in a direct current voltage control mode;
at least one direct current voltage control slave station working in a slave mode; and
at least one common converter station working neither as a master nor as a slave station;
wherein the direct current voltage master control station controls a direct current voltage of the multi-station VSC-HVDC power transmission system, and all remaining converter stations select active power control or frequency control;
wherein the at least one direct current voltage control slave station is configured to continuously monitor the direct current voltage master control station and the direct current voltage of the multi-station VSC-HVDC power transmission system;
wherein the direct current voltage control slave station working in the slave mode switches from its current control mode into the direct current voltage control mode when the direct current voltage control slave station monitors that the direct current voltage master control station shuts down or the difference value of the direct current voltage value and a rated value falls outside a definite threshold range, wherein said at least one common converter station remains in its initial active power control or frequency control throughout system operation.

10. The multi-station VSC-HVDC power transmission system of claim 9, wherein the direct current voltage master control station and the direct current voltage control slave station are connected by the inter-station communications.

11. The multi-station VSC-HVDC power transmission system of claim 9, wherein after the direct current voltage control slave station takes over the direct current voltage control, under the condition of shutdown for a certain period and then recovering normal operation, the direct current voltage master control station selects active power control or frequency control and starts working in the slave mode.

\* \* \* \* \*